(12) United States Patent
Narvaez-Guarnieri et al.

(10) Patent No.: US 6,721,899 B1
(45) Date of Patent: Apr. 13, 2004

(54) FAULT-TOLERANT NON-FLOODING ROUTING

(75) Inventors: Paolo Narvaez-Guarnieri, Middlesex, MA (US); Kai-Yeung Siu, Charlestown, MA (US); Hong-Yi Tzeng, Monmouth, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/481,100

(22) Filed: Jan. 12, 2000

(51) Int. Cl.[7] .................... G06F 11/00; H04L 1/22
(52) U.S. Cl. ............................ 714/4; 370/218
(58) Field of Search .................. 714/4, 3, 7, 13, 714/18, 25, 39, 43, 56; 370/218, 217, 220, 227, 234; 709/104, 105, 220, 221, 239

(56) References Cited

U.S. PATENT DOCUMENTS

| | | | | |
|---|---|---|---|---|
| 5,596,719 A | * | 1/1997 | Ramakrishnan et al. | 395/200.02 |
| 5,917,820 A | * | 6/1999 | Rekhter | 370/392 |
| 5,953,312 A | * | 9/1999 | Crawley et al. | 370/218 |
| 6,098,107 A | * | 8/2000 | Narvaez-Guarnieri et al. | 709/239 |
| 6,240,463 B1 | * | 5/2001 | Benmohamed et al. | 709/238 |
| 6,282,170 B1 | * | 8/2001 | Bentall et al. | 370/225 |
| 6,324,162 B1 | * | 11/2001 | Chaudhuri | 370/225 |

* cited by examiner

*Primary Examiner*—Nadeem Iqbal

(57) ABSTRACT

This invention is an algorithm that restores routing in a link-state network after a link failure without flooding the entire routing area with new routing information. The algorithm operates only in the local neighborhood of the failed link and informs the minimum number of routers about the failure.

10 Claims, 1 Drawing Sheet

TOPOLOGY SUBJECT TO ROUTING LOOPS

TUNNELING PACKETS FROM A TO B

TOPOLOGY SUBJECT TO ROUTING LOOPS

FAULT-TOLERANT NON-FLOODING ROUTING

TECHNICAL FIELD

This invention relates to communication network link-state routing protocols.

BACKGROUND OF THE INVENTION

Link-state routing protocols, such as the Open Shortest Path First (OSPF) or the ISO Intermediate System to Intermediate System routing protocol (IS—IS), are becoming the dominant Internet technology for routing packets within Autonomous Systems. An Autonomous System ("AS" or area) is a group of routers operating a common routing protocol and exchanging routing information.

Under link-state protocols, each router maintains a database describing the Autonomous System's topology. In steady state, every router has an identical database. The information stored in this database includes the routers' local states, e.g., their usable interfaces (links), reachable neighbors, and the links parameters (metrics). The routers distribute their local states throughout the Autonomous System by flooding, i.e., sending the local states to all the routers. Each router then makes its forwarding decisions based on the complete description of the topology of the routing area. All routers operate under the same protocol.

From the topological database, each router constructs a tree of shortest paths (the "shortest path tree" or "SPT") with itself as the root. The routing information obtained from other routers appears on the tree as leaves. The tree provides routes to all destinations within the Autonomous System. Dimensionless metrics describe the costs of the separate links and complete routes.

Thus, in link-state protocol networks, the process of collecting topological information from the network is separated from the process of computing the correct routes. The former is performed distributively by all the routers in an area who share state information with each other. The latter is performed locally by each router. This is the main advantage of link-state protocols, because the computation can be performed quickly and without relying on other routers.

When a cost metric of some link changes, the information need be sent once to every router in the area; the recipients then immediately update their own routing tables under the common protocol. This is in sharp contrast to distance-vector protocols, such as RIP, where multiple routing packets may have to be sent many times between the same routers in order for their routing tables to converge to a steady-state correct value.

Even though the amount of information exchanged by routers operating under link-state protocols is less than the amount of information exchanged under distance-vector protocols, it may still be large when the cost metrics of the links vary quickly, or when the number of links in an area is large. In principle, every router in the area should have at all times the latest topological information. If the topology information is not identical in all routers, routing loops may result. This means that every time that there is a cost metric change in any one of the links, all the routers in the routing area must be notified.

Flooding an entire area after a single link-state change is inefficient in terms of bandwidth and computational overhead required. Furthermore, flooding a large routing area may take a long time. During that time, different routers will have different link-state information, and transient routing loops are possible. Many of the Internet's problems with routing instability are associated with the long delays required to propagate routing information.

One way to reduce the total amount of routing information being transmitted is to have the router responsible for a given link ignore changes in that link's metric. The new information will simply not be propagated and routing will continue along the old paths in a sub-optimal manner. After several metric changes, the router can broadcast a cumulative update packet summarizing all the topological changes that have taken place since last update. By limiting the frequency of such updates, the amount of network information traffic can be limited at the cost of some sub-optimal routing.

This approach does not work when the link change that takes place is a link failure or extreme congestion of the link; in this case, the rest of the network must be notified immediately—withholding link failure information will cause routing failures and loss of packets. Therefore, in order to restore the paths that previously traversed the failed link, information regarding failure of a link must be propagated at least to some routers in the network immediately.

We now discuss three basic ideas regarding routing restoration with limited local updates. Although these ideas are either inefficient or do not work in all cases, they will illustrate the problem and provide the reader with a better insight into our local route restoration scheme.

Tunneling

As illustrated in FIG. 1, when the link between routers A and B goes down, a new path is constructed between these routers through routers N1, N2, and N3. All the traffic that should have traveled through the broken link is now diverted into this new path, which acts as a virtual link.

A tunneling scheme can be implemented as follows. After the link between A and B fails, router A detects the failure, but does not broadcast this information to the rest of the network. Instead, it uses its shortest path first (SPF) engine to compute the new shortest path to router B and records the new next hop for B. Router A then sends a special packet containing the information regarding the failed link through that next hop. When the next hop router, N1 in our example, receives the special packet, it in turn re-computes the new shortest path to B, determines and records the new next hop to B, and forwards the special packet along that next hop. This operation is repeated until router B receives the special packet, i.e., router B is the computed next hop router.

In this manner, router A and all of the routers in the restoration path—routers N1, N2, and N3 in our example—are informed of the link failure and are capable of forwarding packets to B along the new path. When a regular data packet that needs to traverse the failed link arrives at A, the packet is encapsulated in another packet with destination B and forwarded along the newly computed shortest path until it reaches B. Upon arrival at B, the original packet is decapsulated and forwarded according to the established routing table.

This scheme limits the update information that needs to be broadcast after a link failure. Only the routers that are part of the new path from A to B are informed of the changes in the topology. Even though the rest of the network does not know about the failure, global routing continues to function correctly, though possibly sub-optimally.

A major drawback of the tunneling scheme is that every single data packet that goes through the new path has to be encapsulated at router A. This requires A to be able to generate a new packet for every data packet that must be diverted, increasing the load on A and greatly limiting the efficiency of its packet forwarding function.

Local Routing Table Adjustment with Simple Updates

According to this approach, only the routers of the restoration path are informed of the link's failure. These routers modify their routing tables and let their forwarding engines function as usual. In other words, along some restoration path, the new topological information is broadcast and the routing tables are re-computed, whereas the other routers continue using old routing tables. In our previous example (see FIG. 1), if routers A, N1, N2, and N3 simply re-computed their routing tables using the new information about the link failure, global routing might still function correctly. Even though router S continues to use an old routing table, a packet from S to D might still be routed correctly, although possibly sub-optimally.

We say might because this partial update scheme is not restrictive enough to guarantee proper forwarding. Because the actual path that a packet takes is determined on a hop-by-hop basis by routers with different topological information, routing loops may occur.

Consider the example in FIG. 2, where the number next to each link is the cost metric of that link. After the link between routers A and B fails, a restoration path is established between routers A and B via router C. Only the routing tables of A and C are updated.

When a packet with destination D arrives at C, it is forwarded to E because E lies on the shortest path to D. But when the packet arrives at E, which has not been informed of the failure of the link between A and B, the packet is forwarded back to C because it appears to E that the shortest path to D is C-A-B-D. Therefore, a routing loop results between routers C and E.

The problem with this scheme is that a packet can leave the restoration path—in the example, A, C, and B—too soon. When this happens, the packet will enter a region where routers do not have current routing tables; these routers can forward the packet back to an earlier part of the restoration path, causing routing loops.

Local Routing Table Adjustment Uniform Updates

This approach is a straightforward and intuitive attempt to modify the scheme discussed immediately above. Here, we force all the packet that would have had to traverse the failed link to travel through the entire restoration path. This can be achieved by modifying the routing tables in the routers belonging to the restoration path in such a way that all packets that would have had to traverse the failed link are now forwarded to the new next hop for B. All the packets that router A would have forwarded to B through the failed link will now be forwarded to B along the restoration path; these packets will not leave the restoration path until they reach B.

Unfortunately, this scheme may not work either. Unlike its predecessor, this scheme is too restrictive in the way next hops are selected, and this may lead to routing loops when a packet does not exit the restoration path timely.

Consider, for example, a packet traveling from node S to node E in FIG. 1. Before the failure of the link between A and B, the packet would traverse routers A, B, and N3. After the link failure, the packet is forced to traverse routers N1, N2, N3, and B. At B, the packet is forwarded back to N3, resulting in a routing loop.

OBJECT OF THE INVENTION

Accordingly, the object of the present invention is to provide a routing algorithm that, after a link failure, restores all the paths traversing the failed link, ensure loop-free routing, and minimize communication overhead.

SUMMARY OF THE INVENTION

To accomplish the aforementioned object, we provide an algorithm that restores loop-free routing after a single link failure by informing only some of the routers in the local neighborhood of the failed link.

According to the invention, after link L between routers A and B fails, the following steps are taken:

1. A set of nodes $D_0$ is defined as all the nodes that are descendants of L in any current shortest path tree rooted at A;
2. The link-state database of router A is modified to incorporate the change in the metric of link L;
3. The Shortest Path First engine in router A re-computes the next hop router for B, designated $N_1$;
4. In router A, the next hop for all destinations belonging to set $D_0$ is set to $N_1$;
5. A special packet identifying router B and the failed link L is sent to $N_1$;
6. In router $N_i$ (i=1 . . . n) that receives the special packet, a set $D_i$ is defined as all the nodes that are descendants of L in any current shortest path tree rooted at $N_i$;
7. In $N_i$, the link state database is modified to incorporate the change in the metric of link L;
8. In router $N_i$, the SPF engine re-computes the next hop for router B, designated $N_{i+1}$;
9. In router $N_i$, the next hop for all destination nodes in $D_i$ is set to $N_{i+1}$;
10. If router $N_{i+1}$ is not router B, send a special packet to $N_{i+1}$ identifying router B and the failed link L;
11. Steps 6–10 are repeated until the computed next hop is router B.

DETAILED DESCRIPTION OF THE INVENTION

Figure 1:
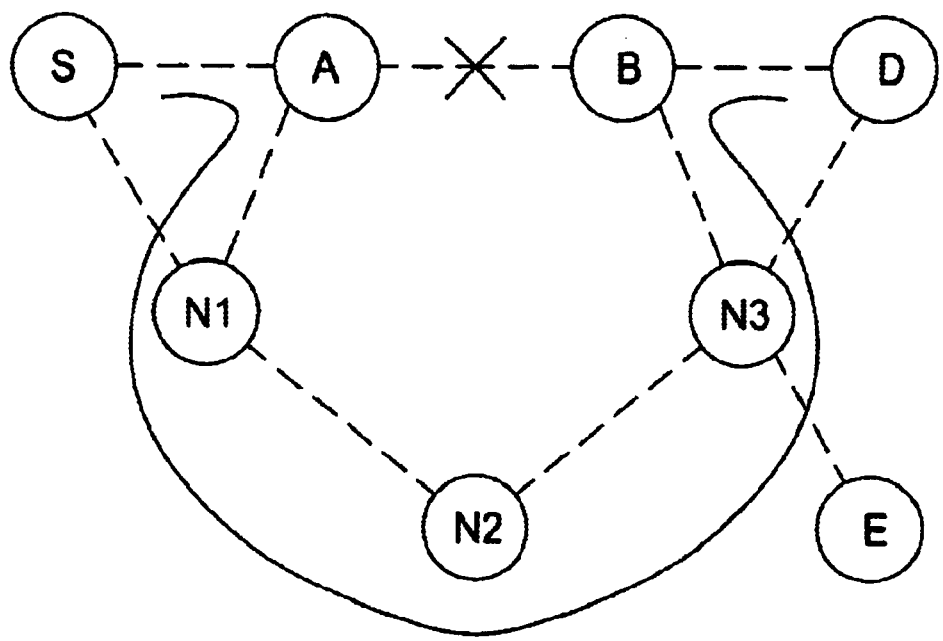
FIG. 1 demonstrates tunneling of packets between two routers after failure of the direct link connecting the two routers.
Figure 2:
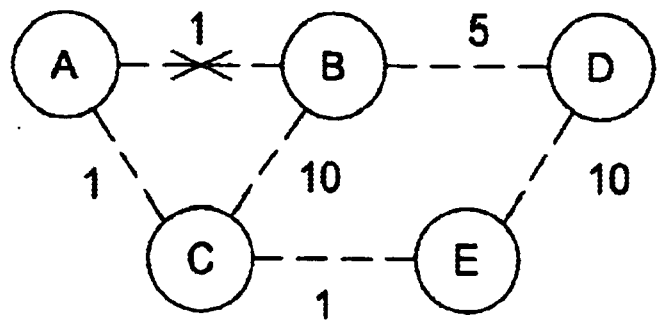
FIG. 2 illustrates occurrence of a routing loop.

As was noted in the OBJECTIVES section, it is highly desirable to restore loop-free routing after a link failure in a way that minimizes communication overhead. Because communication overhead is related to the number of routers that need to be notified of the failure, we would like to minimize the number of notified routers. The question then arises as to how many routers must necessarily be notified after the failure.

Before proceeding any further, let us define the following concepts:

For a given failure of some directed link between routers A and B, a restoration path is defined as any set of routers that includes A (but not necessarily B) and forms a single path from A to B. A shortest restoration path is a restoration path that minimizes the distance between A and B. A minimal restoration path is restoration path with the minimum number of elements, i.e., routers.

The inventors herein have discovered that given an arbitrary network topology and any failure of some link L connecting A to B, if the number of routers that are informed of the failure is less than the size M of the minimal restoration path of L, then there is always a set of metrics for the links of the network that will cause any restoration scheme to create routing loops.

This means that any general purpose scheme used for path restoration must inform at least a number M of routers that is equal to the size of the minimal restoration path. If fewer than M routers are informed, then for any topology and every link, there is always some set of link metrics that will cause some packets to enter routing loops. Therefore, any algorithm that can restore loop-free routing for all sets of link metrics must inform at least M routers of the link failure.

We now prove the above statement. Proof:

Assume that an arbitrary link L (A, B) in an arbitrary topology fails. Let N be the total number of routers in the network. We now construct a set of link metrics such that every incoming link into B, except L, has a cost metric equal to N, with N>>1. Every other link has a cost metric of 1. Let M be the size, i.e., the number of routers, of the minimal restoration path of the link L. Finally, a restoration algorithm informs fewer than M routers of the link failure.

Consider the path of a packet P that starts at the router A and has router B as its destination. $P_h$ designates the router where the packet P is located after traveling for h hops. We also define $D(n_1, n_2)$ to be the minimum hop count from router $n_1$ to router $n_2$. Because of the high costs of the links going into B (other than link L), any router in the network with connectivity to A that is uninformed of L's failure will calculate a shortest path from itself to B passing through A. Therefore, such uninformed routers will forward the packet to a next hop which is one hop closer to A. In our terminology, if $P_h$ is uninformed, then $D(A, P_{h+1})=D(A, P_h)-1$. On the other hand, if $P_h$ is an informed router, the packet can be forwarded at most one hop further away from A, $D(A, P_{h+1}) \leq D(A, P_h)+1$.

If a routing algorithm can move the packet P from A to B in k hops traversing i informed routers, then it follows that the packet must traverse (k-i) uninformed routers. After k hops, we know that the following relationship holds:

$$D(A, P_k) \leq D(A, P_0)+i-(k-i) \leq 0+2i-k$$

Recall that i<M, since fewer than M routers are informed. Because the number of traversed hops has to be at least the minimum hop count between A and B, it follows that $k \geq M$. Therefore, $D(A, P_k)<M$. This contradicts our assumption that the packet reaches B after k hops, which implies that $D(A, P_k)=M$.

Thus, for loop-free routing, the restoration algorithm must inform at least the number of routers in the restoration path. This is a necessary condition. The algorithm described in the SUMMARY OF THE INVENTION section of this document restores loop-free routing by notifying routers in an arbitrary restoration path. In other words, when a network N that uses a link-state routing protocol with shortest path routing suffers from a single link failure, our algorithm guarantees that loop-free routing will continue in N after the link failure. This condition is sufficient. Before we prove the main result, we introduce additional definitions and lemmas.

Definition

Let $P_d$ be a packet that has node d as its destination. Let $R(P_d, h)$ be the router where the packet $P_d$ is located h hops after being first transmitted. After a failure of a link L, the packet $P_d$ is said to be affected at hop h if and only if node d is a descendent of link L in some SPT that was rooted at $R(P_d, h)$ before the link's failure.

The notion of a packet being affected by a link's failure reflects whether or not the computation of the packet's next hop may be influenced by the effects of the link's failure at some point. If the packet is affected at a given hop h, something should be done to correct its routing, whereas if the packet is unaffected, routing can proceed as before. We now make the following statements about how the affected state of a packet evolves with time.

Lemma 1

After failure of link L and restoration of routing based on our algorithm, if a packet $P_d$ at hop h is not affected, then it will not be affected at future hops h', where h'>h.

Proof of Lemma 1

Let $P_d$ be a packet that is not affected at hop h. If $R(P_d, h)$ is not an informed router, then $P_d$ will be forwarded in the same manner as before the link's failure. If $R(P_d, h)$ is an informed router, then our algorithm will only change the routing table entries for the destinations that are descendants of L in any SPT computed at $R(P_d, h)$. Since $P_d$ is not affected at hop h, destination d cannot be one of the routing table entries that was modified. Therefore, $P_d$ will also be forwarded in the same manner as before the link's failure. In either case, $P_d$ is forwarded along the SPT that existed before the failure. By the definition of affected packet, there is no shortest path between $R(P_d, h)$ and d that traverses link L. Therefore, $P_d$ will also not be affected at hop (h+1). By repeating this argument, we conclude that $P_d$ will not be affected at any hop h', where h'>h.

We have proven that a packet that is unaffected at a given hop count will remain so and will safely reach its destinations using the same path as before the link failure. Let us next examine what happens to a packet that is affected at a given hop count.

Lemma 2

After failure of link L and restoration of routing based on our algorithm, if a packet $P_d$ is affected at hop h, then at some hop count h'>h, one of three events will occur: (i) $P_d$ will have reached the destination at d, (ii) $P_d$ will become unaffected, or (iii) $R(P_d, h')$ will be an informed router in the restoration path. Furthermore, the path taken by $P_d$ between hops h and h' will have been loop-free.

Proof of Lemma 2

If $R(P_d, h)$ is an informed router, then lemma 2 is obviously true with h=h'. If $R(P_d, h)$ is not an informed router, then $P_d$ will be forwarded towards d following some path in the old SPT. The shortest distance between $R(P_d, h+1)$ and d according to the old topology, i.e., before the link failure, will therefore be smaller than the shortest distance between $R(P_d, h)$ and d. Therefore, while $P_d$ remains affected and is inside uninformed routers, $P_d$ will be traveling in a loop-free manner towards d. At some point in time, one of the three cases outlined above will have to take place.

Our last lemma addresses the sole remaining case—what happens to $P_d$ when it is both affected and inside an informed router.

Lemma 3

After failure of link L (A, B) and restoration of routing based on our algorithm, if a packet $P_d$ is affected at hop h and R ($P_d$, h) is an informed router, then at some future hop count h'≧h, $P_d$ will not be affected. As in the previous case, the path traversed between hops h and h' will have been loop-free.

Proof of Lemma 3

According to our algorithm, all of the routing table entries for destinations that were descendants of L in some old SPT are modified in the same way. Therefore, destination d is one of the entries that is modified in routing table of router R($P_d$, h). According to the algorithm, $P_d$ will be forwarded to the next hop of the restoration path. If at the next hop $P_d$ is not affected, the statement is satisfied. If at the next hop $P_d$ is still affected, $P_d$ will continue to be forwarded along the restoration path until it becomes unaffected or it reaches router B. Since the old SPT computed at B could not have contained any loops at B, $P_d$ must be unaffected.

We now complete the proof of correctness of the main result regarding our restoration algorithm by considering all the different trajectories that a packet may take.

According to Lemma 1, if a packet starts traveling unaffected, it will continue to be unaffected until it reaches its destination in a loop-less manner. If it doesn't start unaffected, according to Lemma 2, it will either reach its destination in a loop-less manner, become unaffected while traveling loop-less (in which case the destination will be reached in a loop-less manner), or will arrive at an informed router in a loop-less manner. If it reaches an informed router, according to Lemma 3, the packet will become unaffected and therefore reach its destination in a loop-less manner. Therefore, for any combination of circumstances—topology, metrics, link failure, starting router, destination router—a packet will reach its destination without traveling through loops.

While the features of the invention have been described and illustrated with some specificity, it will be understood by those skilled in the art that changes in the above description or illustration may be made with respect to form or detail without departing from the spirit and scope of the invention.

We claim:

1. A non-flooding routing restoration method for use in a network with link-state routing protocol and shortest path routing, said network comprising a plurality of nodes and a plurality of links between the nodes, each said link being associated with a metric, said plurality of nodes including a plurality of routers, said plurality of routers comprising a first router and a second router, said plurality of links comprising a first link between said first router and said second router, said method comprising the steps of:

determining all nodes of a set of nodes $D_0$, said set $D_0$ including all descendants of said first link in any current shortest path tree rooted at said first router;

modifying a link-state database of said first router to include a change in a metric of said first link;

selecting a restoration path for sending packets from said first router to said second router, said restoration path being loop-free and not traversing said first link, said restoration path including n restoration path routers in a sequence, n being one or more, the sequence determined by the order in which a packet traveling from said first router to said second router along said restoration path would encounter said restoration path routers, a first restoration path router being one hop away from said first router, said second router being one hop away from a last restoration path router;

setting, in said first router, next hops for all nodes of said set $D_0$ to said first restoration path router;

notifying each restoration path router of said change in said metric of said first link;

identifying all nodes of a set of nodes associated with said each restoration path router, said set of nodes associated with said each restoration path router including all descendants of said first link in any current shortest path tree rooted at said each restoration path router;

assigning, in each restoration path router except said last restoration path router, next hops for all nodes of the set of nodes associated with said each restoration path router to an immediately following restoration path router in the sequence;

designating, in said last restoration path router, next hops for all nodes of the set of nodes associated with said last restoration path router to said second router.

2. A method according to claim 1, further comprising the step of incorporating said change in said metric of said first link in link-sate databases of said restoration path routers.

3. A method according to claim 2, wherein said step of incorporating includes the step of reconstructing, in said each restoration path router, a routing table based on a shortest path tree computation corresponding to said each restoration path router, said computation carried out on topological data that include said change in said metric of said first link.

4. A method according to claim 1 wherein said step of selecting includes the step of determining a shortest restoration path from said first router to said second router.

5. A method according to claim 1 wherein said step of selecting includes the step of determining a minimal restoration path from said first router to said second router.

6. A method according to claim 1 wherein said network's routing protocol is OSPF.

7. A method according to claim 1 wherein said network's routing protocol is IS—IS.

8. Apparatus for updating routing in a network with link-state routing protocol and shortest path routing, said network comprising a plurality of nodes and a plurality of links between the nodes, each said link being associated with a metric, said plurality of nodes including a plurality of routers, said plurality of routers comprising a first router and a second router, said plurality of links comprising a first link between said first router and said second router, the apparatus comprising:

means for modifying a link-state database of said first router to include a change in a metric of said first link;

means for selecting a restoration path for sending packets from said first router to said second router, said restoration path including n restoration path routers in a sequence, n being one or more, the sequence determined by the order in which a packet traveling from said first router to said second router along said restoration path would encounter said restoration path routers, a first restoration path router being one hop away from said first router, said second router being one hop away from a last restoration path router;

means for setting, in said first router, next hops for all nodes that are descendants of said first link in any current shortest path tree rooted at said first router to said first restoration path router;

means for notifying each restoration path router of said change in said metric of said first link;

means for identifying all nodes of a set of nodes associated with said each restoration path router, said set of nodes associated with said each restoration path router including all descendants of said first link in any current shortest path tree rooted at said each restoration path router;

means for assigning, in each restoration path router except said last restoration path router, next hops for all nodes belonging to the set of nodes associated with said each restoration path router to an immediately following restoration path router in the sequence;

designating, in said last restoration path router, next hops for all nodes belonging to the set of nodes associated with said last restoration path router to said second router.

9. Apparatus according to claim 8, wherein said means for selecting a restoration path selects a shortest restoration path and, said means for selecting a restoration path further includes short path first engines in said restoration path.

10. Apparatus according to claim 8, wherein said means for selecting a restoration path selects a minimal restoration path.

\* \* \* \* \*